United States Patent
Florissi et al.

(10) Patent No.: US 7,949,739 B2
(45) Date of Patent: *May 24, 2011

(54) METHOD AND APPARATUS FOR DETERMINING CAUSALITY MAPPING OF DISTRIBUTED SYSTEMS

(75) Inventors: Danilo Florissi, Briarcliff Manor, NY (US); Patricia Gomes Soares Florissi, Briarcliff Manor, NY (US); Udi Kleers, Elmsford, NY (US); Shmuel Kliger, Chappaqua, NY (US); Eyal Yardeni, Ardsley, NY (US); Yechiam Yemini, Cos Cob, CT (US)

(73) Assignee: EMC Corporation, Hopkinton, MA (US)

( * ) Notice: Subject to any disclaimer, the term of this patent is extended or adjusted under 35 U.S.C. 154(b) by 1286 days.

This patent is subject to a terminal disclaimer.

(21) Appl. No.: 11/077,932

(22) Filed: Mar. 11, 2005

(65) Prior Publication Data
US 2005/0210132 A1  Sep. 22, 2005

Related U.S. Application Data

(60) Provisional application No. 60/552,559, filed on Mar. 12, 2004.

(51) Int. Cl.
*G06F 15/173* (2006.01)

(52) U.S. Cl. .................. 709/223; 709/224; 709/225

(58) Field of Classification Search .............. 709/223, 709/224, 225
See application file for complete search history.

(56) References Cited

U.S. PATENT DOCUMENTS

| | | | |
|---|---|---|---|
| 5,528,516 A | 6/1996 | Yemini et al. | |
| 5,661,668 A | 8/1997 | Yemini et al. | |
| 6,249,755 B1 | 6/2001 | Yemini et al. | |
| 6,571,285 B1 * | 5/2003 | Groath et al. | 709/223 |
| 7,023,440 B1 * | 4/2006 | Havekost et al. | 345/440 |

* cited by examiner

*Primary Examiner* — Adnan Mirza

(74) *Attorney, Agent, or Firm* — Krishnendu Gupta; Joseph D'Angelo

(57) ABSTRACT

A method and apparatus for determining causality mapping between causing events and detectable events among a plurality of nodes in a distributed system is disclosed. The method comprises the steps of automatically generating a causality mapping model of the dependences between causing events at the nodes of the distributed system and the detectable events in a subset of the nodes, the model suitable for representing the execution of at least one system operation. In one aspect the generation is perform by selecting nodes associated with each of the detectable events from the subset of the nodes and indicating the dependency between a causing event and at least one detectable event for each causing event at a node when the causing event node is a known distance from at least one node selected from the selected nodes. In still another aspect, the processing described herein is in the form of a computer-readable medium suitable for providing instruction to a computer or processing system for executing the processing claimed.

35 Claims, 16 Drawing Sheets

Given: A graph G representing the network. A set of nodes (Go) selected from the set of nodes G that can host monitors. The set of routes R between pair of nodes in Go.

Steps:
1. For each pair of nodes n1 and n2 of Go:
   a. Create an entry in the mapping representation for the connection (n1,n2).
2. For each node n in G:
   a. Create entry in the mapping representation in the codebook table for n.
   b. For each (n1,n2), check to see if n is in the route R between n1 and n2.
      i. If yes, then mark 1 in the intersection of (n1,n2) and n in the mapping representation.

FIG. 5B

Given: A graph G representing the network. A set of nodes (Go) selected from the set of nodes G that can host monitors. The set of routes R between pair of nodes in Go.

Steps:
1. For each pair of nodes n1 and n2 of Go:
   a. Create entry in the mapping representation for the connection (n1,n2).
2. For each node n in G:
   a. Create entry in the mapping representation in the codebook table for n.
   b. For each (n1,n2), check to see if n is in the route R between n1 and n2.
      i. If yes, then mark p in the intersection of (n1,n2) and n in the mapping representation.

Given: A graph $G$ representing the network. A set of nodes ($Go$) selected from the set of nodes $G$ that can host monitors. The number $r$ of hops that a node failure will impact.

Steps:
1. For each pair of nodes $n1$ and $n2$ of $Go$:
   a. Create an entry in the mapping representation for the connection $(n1,n2)$.
2. For each node $n$ in $G$:
   a. Create an entry in the mapping representation table for $n$.
   b. For each column $(n1,n2)$, check to see if $n1$ or $n2$ are within $r$ hops from $n$ in $G$.
      i. If yes, then mark indication in the intersection of $(n1,n2)$ and $n$ in the mapping representation.

FIG. 7B

Given: A graph $G$ representing the network. A set of nodes ($Go$) selected from the set of nodes $G$ that can host monitors. The number $r$ of hops that a node failure will impact.

Steps:
1. For each pair of nodes $n1$ and $n2$ of $Go$:
   a. Create an entry in the mapping representation for the connection $(n1,n2)$.
2. For each node $n$ in $G$:
   a. Create an entry in the mapping representation for $n$.
   b. For each column $(n1,n2)$, check to see if $n1$ or $n2$ are within $r$ hops from $n$ in $G$.
      i. If yes, mark an indication, $f(p,n,n1,n2)$, in the intersection of $(n1,n2)$ row $n$ in the mapping representation.

| | CONNECTION | | | | | | | | | |
|---|---|---|---|---|---|---|---|---|---|---|
| | E01 | E02 | E03 | E04 | E06 | E07 | E09 | E10 | E11 | E12 |
| E01 | 1 | 1 | | 1 | | | | | | |
| E02 | 1 | 1 | 1 | | | | | | | |
| E03 | | 1 | 1 | | 1 | | | | | |
| E04 | 1 | | | 1 | | 1 | | | | |
| E06 | | | 1 | | 1 | | 1 | | | |
| E07 | | | | 1 | | 1 | | 1 | | |
| E09 | | | | | 1 | | 1 | 1 | | 1 |
| E10 | | | | | | 1 | | 1 | 1 | |
| E11 | | | | | | | | 1 | 1 | 1 |
| E12 | | | | | | | 1 | | 1 | 1 |
| R01 | 1 | 1 | 1 | 1 | | 1 | | | | |
| R02 | 1 | 1 | 1 | 1 | 1 | | | | | |
| R03 | 1 | 1 | 1 | | 1 | | 1 | | | |
| R04 | 1 | 1 | 1 | 1 | | 1 | | 1 | | |
| R05 | 1 | 1 | 1 | | | | | | 1 | |
| R06 | | 1 | 1 | | 1 | | 1 | | | 1 |
| R07 | 1 | | | 1 | | 1 | | 1 | 1 | 1 |
| R08 | | 1 | | | | | | 1 | 1 | 1 |
| R09 | | | 1 | | 1 | | 1 | 1 | 1 | 1 |
| R10 | | | | 1 | | 1 | 1 | 1 | 1 | 1 |
| R11 | | | | | | 1 | 1 | 1 | 1 | 1 |
| R12 | | | | | 1 | | 1 | 1 | 1 | 1 |

FIG. 10

| | CONNECTION | | | | | | | | | | | | | | | | | | | | |
|---|---|---|---|---|---|---|---|---|---|---|---|---|---|---|---|---|---|---|---|---|---|
| NODE(E)<br>NODE(E) | 01<br>02 | 01<br>03 | 01<br>04 | 01<br>05 | 01<br>06 | 01<br>07 | 02<br>03 | 02<br>04 | 02<br>05 | 02<br>06 | 02<br>07 | 03<br>04 | 03<br>05 | 03<br>06 | 03<br>07 | 04<br>05 | 04<br>06 | 04<br>07 | 05<br>06 | 05<br>07 | 06<br>07 |
| ROUTE 1<br>(R NODE) | 01<br>02 | 01<br>03 | 01<br>02<br>04 | 01<br>02<br>04<br>05 | 01<br>02<br>04<br>05<br>06 | 01<br>02<br>04<br>07 | 02<br>01<br>03 | 02<br>04 | 02<br>04<br>05 | 02<br>04<br>05<br>06 | 02<br>04<br>07 | 03<br>04 | 03<br>04<br>05 | 03<br>04<br>05<br>06 | 03<br>04<br>07 | 04<br>05 | 04<br>05<br>06 | 04<br>05<br>07 | 05<br>06 | 05<br>04<br>07 | 06<br>07 |
| ROUTE 2<br>(R NODE) | | | 01<br>03<br>04 | 01<br>03<br>04<br>05 | 01<br>02<br>04<br>07<br>06 | 01<br>03<br>04<br>07 | 02<br>04<br>03 | | | 02<br>04<br>07<br>06 | | | | 03<br>04<br>07<br>06 | | | 04<br>07<br>06 | | | 05<br>06<br>07 | |
| ROUTE 3<br>(R NODE) | | | | | 01<br>03<br>04<br>05<br>06 | | | | | | | | | | | | | | | | |
| ROUTE 4<br>(R NODE) | | | | | 01<br>03<br>04<br>07<br>06 | | | | | | | | | | | | | | | | |

FIG. 11A

Given: A graph $G$ representing the network. A set of nodes ($Go$) selected from the set of nodes $G$ that can host monitors. The number $r$ of hops that a node failure will impact.

Steps:
1. For each pair of nodes $n1$ and $n2$ of $Go$:
   a. Create an entry in the mapping representation for the connection $(n1,n2)$.
2. For each node $n$ in $G$:
   a. Create an entry in the mapping representation table for $n$.
   b. For each column $(n1,n2)$, check to see if $n1$ or $n2$ are within $r$ hops from $n$ in $G$.
      i. If yes, then mark indication, e.g., "1", in the intersection of $(n1,n2)$ and $n$ in the mapping representation.
3. For each node $n$ that is a cut node or adjacent to a cut edge in $G$:
   a. Locate the entry in the mapping representation for $n$.
   b. For each $(n1,n2)$, check to see if $n1$ or $n2$ lie in two different partitions of $G-n$.
      i. If yes, then mark an indication in the intersection of $(n1,n2)$ and $n$ in the mapping representation.

FIG. 11B

Given: A graph $G$ representing the network. A set of nodes ($Go$) selected from the set of nodes $G$ that can host monitors. The radius $r$ of hops that a node failure will impact. A probability $p$. A function $f$ that takes as input a probability and two distances and returns a probability.

Steps:
1. For each pair of nodes $n1$ and $n2$ of $Go$:
   a. Create an entry in the mapping representation for the connection $(n1,n2)$.
2. For each node $n$ in $G$:
   a. Create an entry in the mapping representation table for $n$.
   b. For each $(n1,n2)$, check to see if $n1$ or $n2$ are within $r$ hops away from in $G$.
      i. If yes, then let $d(x,y)$ be the distance in hops between $x$ and $y$. Mark with an indication, $f(p,n,n1,n2)$ in the intersection of $(n1,n2)$ and $n$ in the mapping representation.
3. For each node $n$ that is a cut node or adjacent to a cut edge in $G$:
   a. Locate the entry in the mapping representation for $n$.
   b. For each $(n1,n2)$, check to see if $n1$ or $n2$ lie in two different partitions of $G-n$.
      i. If yes, then mark an indication in the intersection of $(n1,n2)$ and $n$ in the mapping representation.

FIG. 12

| | CONNECTION | | | | | | | | | | | | | | | | | | | | |
|---|---|---|---|---|---|---|---|---|---|---|---|---|---|---|---|---|---|---|---|---|---|
| | 01-02 | 01-03 | 01-04 | 01-05 | 01-06 | 01-07 | 02-03 | 02-04 | 02-05 | 02-06 | 02-07 | 03-04 | 03-05 | 03-06 | 03-07 | 04-05 | 04-06 | 04-07 | 05-06 | 05-07 | 06-07 |
| R01 | 100 | 100 | 100 | 100 | 100 | 100 | 50 | | | | | | | | | | | | | | |
| R02 | 100 | | 50 | 50 | 50 | 50 | 100 | 100 | 100 | 100 | 100 | | | | | | | | | | |
| R03 | | 100 | 50 | 50 | 50 | 50 | 100 | | | | | 100 | 100 | 100 | 100 | | | | | | |
| R04 | | | 100 | 100 | 100 | 100 | 50 | 100 | 100 | 100 | 100 | 100 | 100 | 100 | 100 | 100 | 100 | 100 | | 50 | |
| R05 | | | | 100 | | | | | 100 | 50 | | | 100 | 50 | | 100 | 50 | | 100 | 100 | |
| R06 | | | | | 100 | | | | | 100 | | | | 100 | | | 100 | | 100 | 50 | 100 |
| R07 | | | | | 50 | 100 | | | | 50 | 100 | | | 50 | 100 | | | 100 | | 100 | 100 |

Given: A graph $G$ representing the network. A set of nodes ($G_0$) selected from the set of nodes $G$ that can host monitors.

Steps:
1. For each pair of nodes $n1$ and $n2$ of $G_0$:
   a. Create an entry in the mapping representation for the connection $(n1,n2)$
2. For each node $n$ in $G$:
   a. Create entry in the mapping representation for $n$.
   b. For each $(n1,n2)$.
      i. Let $R(n1,n2)$ be the set of routes between $n1$ and $n2$.
      ii. Let $g(n1,n2,k)$ be the number of routes in $R(n1,n2)$ of size $k$. and $g(n1,n2)$ be a function of all $g(n1,n2,k)$.
      iii. Let $c(n1,n2,n,k)$ be the number of times that node $n$ appears in a route in $R(n1,n2)$ of size $k$ and $c(n1,n2,n)$ is a function of all $c(n1,n2,n,k)$.
      iv. Let $h(n1,n2,n,k)$ be a function that relates functions $c$ and $g$, wherein an indication, $h(n1,n2,n)$, is provided in the mapping representation when a relationship between $(n1,n2)$ and $n$ is determined.

METHOD AND APPARATUS FOR DETERMINING CAUSALITY MAPPING OF DISTRIBUTED SYSTEMS

CLAIM OF PRIORITY

This application claims the benefit, pursuant to 35 USC §119(e), of the earlier filing date of U.S. Provisional Patent Application Ser. No. 60/552,559, entitled "Method and Apparatus for Monitoring Distributed Systems," filed in the US Patent Office on Mar. 12, 2004, the contents of which are incorporated by reference, herein.

RELATED APPLICATIONS

This application is related to commonly-owned:

U.S. patent application Ser. No. 11/077,933 entitled "Method and Apparatus for Determining Monitoring Locations in Distributed Systems," concurrently filed;

U.S. patent application Ser. No. 11/034,192, entitled "Method and Apparatus for Event Correlation and Problem Reporting," filed on Jan. 12, 2005

U.S. patent application Ser. No. 10/400,718, entitled "Method and Apparatus for Event Correlation and Problem Reporting," now US Pat. No. 6,868,367 filed on Mar. 23, 2003;

U.S. Pat. No. 6,249,755, entitled "Apparatus and Method for Event Correlation and Problem Reporting," filed on Jul. 15, 1997;

U.S. Pat. No. 5,661,668, entitled "Apparatus and Method for Analyzing and Correlating Events in a System Using a Causality Matrix," filed on Jul. 12, 1996; and U.S. Pat. No. 5,528,516; entitled "Apparatus and Method for Event Correlation and Problem Reporting," filed on May 25, 1994, the contents of all of which are incorporated by reference herein.

BACKGROUND OF THE INVENTION

1. Field of the Invention

The present invention relates to the field of networks and distributed systems and, more particularly, to methods for generating models for determining casualty relationships between the occurrences, and the sources, of problems in the on observable events resulting from such occurrences.

2. Description of Related Art

As computer networks and other systems have become more complex, their reliability has become dependent upon the successful detection and management of problems in the system. Problems can include faults, performance degradation, intrusion attempts and other exceptional operational conditions requiring handling. Problems generate observable events, and these events can be monitored, detected, reported, analyzed and acted upon by humans or by programs. However, as systems have become more complex, the rate at which observable events occur has increased super-linearly, making problem management more difficult.

As an example, when the number of computer nodes in a network increases, the network complexity increases super-linearly with the number of nodes, with a concomitant increase in the fault rate. Compounding this problem of network complexity is fault propagation between both machines and network protocol layers; these propagated faults can generate additional events.

Automated management systems can help to cope with this increase in the number and complexity of events by (1) automating the collection and reporting of events, thereby reducing the load on human operators or programs; (2) using event correlation techniques to group distinct events, thereby compressing the event stream into a form more easily managed by human operators; (3) mapping groups of events to their underlying causes, thus reducing the time between faults and repairs; and (4) automatically correcting diagnosed problems, thereby minimizing operator intervention.

However, it is difficult and almost impossible to accurately model the underlying system, particularly as the networks increase in size and complexity. Moreover, for complex phenomena, a network model representation can quickly grow to unmanageable size because of the number of components that are contained in the network and, consequently, in the model.

Hence, a need exists in the industry for automated methods for generating accurate networks models.

SUMMARY OF THE INVENTION

A method and apparatus for determining causality mapping between causing events and detectable events among a plurality of nodes in a distributed system is disclosed. The method comprises the steps of automatically generating a causality mapping model of the dependences between causing events at the nodes of the distributed system and the detectable events associated with a subset of the nodes, the model suitable for representing the execution of at least one system operation. In one aspect of the invention, the generation is perform by selecting nodes associated with each of the detectable events from the subset of the nodes and indicating the dependency for each causing event at a node when the node is a known distance from at least one node selected from the subset of nodes.

BRIEF DESCRIPTION OF THE DRAWINGS

FIG. 4 illustrates the routes for the network N1;

FIGS. 5A and 5B illustrate exemplary processing associated with a first aspect of the present invention;

FIG. 6 illustrates a model representation of network N1 associated with the processing shown in FIG. 5A in accordance with the principles of the present invention;

FIGS. 7A and 7B illustrate exemplary processing associated with a second aspect of the present invention;

FIG. 8A illustrates a model representation of the network N1 associated with the processing shown in FIG. 7A, in accordance with the principles of the present invention;

FIG. 8B illustrates a model representation of the network N1 associated with the processing shown in FIG. 7B, in accordance with the principles of the present invention;

FIG. 10 illustrates the routes for the network shown in FIG. 9;

FIGS. 11A and 11B illustrate exemplary processing associated with a third aspect of the present invention;

FIG. 12 illustrates a cp-LNH model representation of the network N2, in accordance with the principles of the invention;

FIG. 13 illustrates an cp-LNH model representation of the network N1, in accordance with the principles of the invention;

FIG. 14 illustrates exemplary processing associated with a fourth aspect of the present invention.

Figure 1:
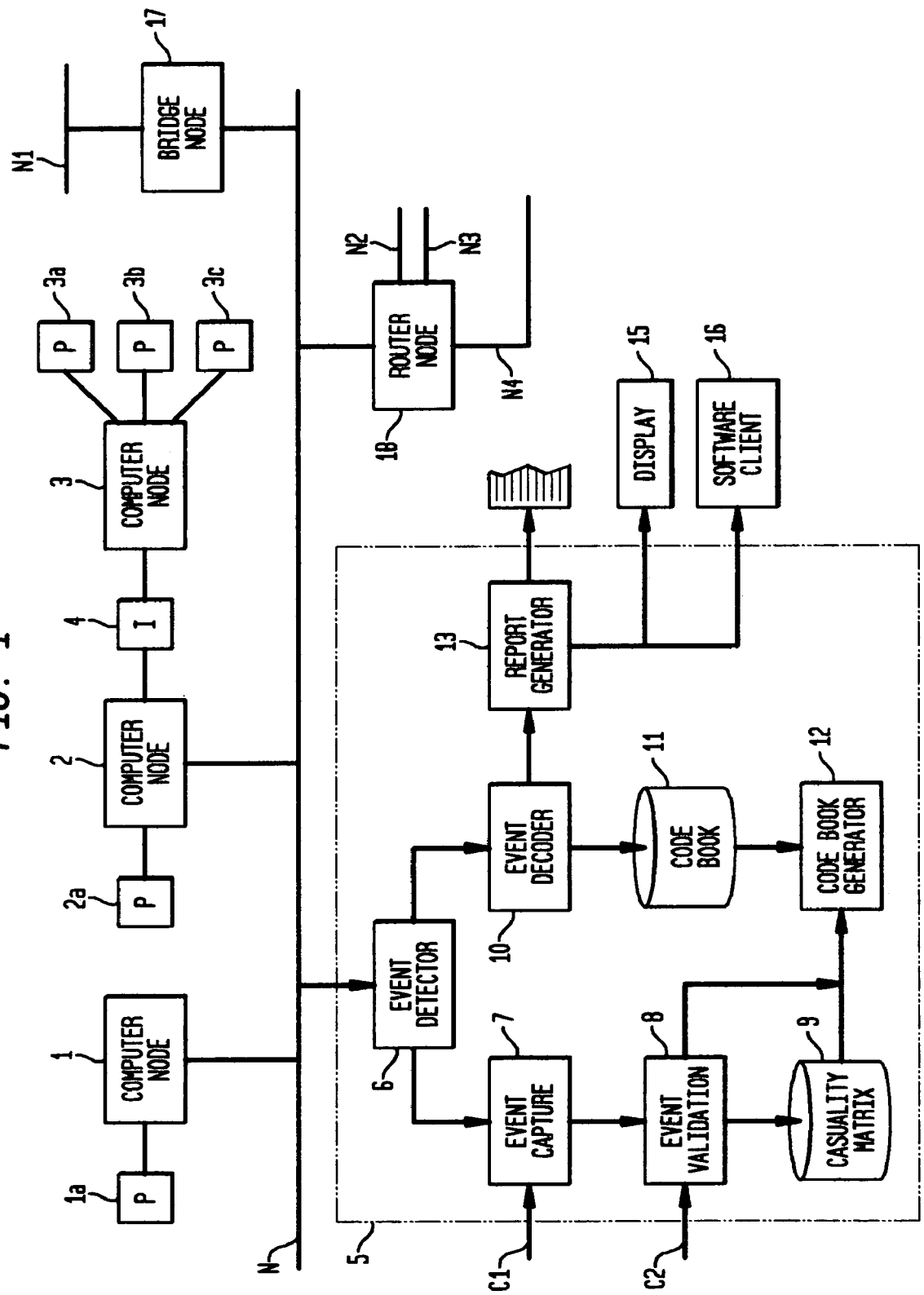
FIG. 1 illustrates a conventional problem reporting system

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements

DETAILED DESCRIPTION

FIG. 1 illustrates a networked computer system connected to apparatus 5 in accordance with the principles of the present invention. Three computer nodes 1, 2, and 3 are shown connected to a computer network N. The network N is interconnected with other networks (N1, N2, N3, N4) via communication nodes, a bridge node 17 and a router node 18. The phrase "network of computer nodes" as used herein and in the claims will be understood to refer to both a network which only includes computer nodes and to a network which further includes communication nodes. Each computer node may also be connected to peripherals such as 1a, 2a, and 3a-3c. Moreover, two or more computer nodes may be connected via an interface 4. Each computer node may generate one or more signals on network N, or through other means, corresponding to symptoms in the system. Examples of symptoms for which signals may be generated could include power failure, peripheral failure, temperature limit exceeded, network interface error, adding a new address on the network, or the like. Of course, any conceivable type of symptom which can be detected could be generated. Through the use of apparatus 5, the networked computer system may be monitored and problems reported based on observed symptoms.

Apparatus 5, which may be implemented on a computer of any of various types, is connected to network N, although it may be connected to the system through any other means such as direct I/O connections to the various computer nodes or by a wireless link. Apparatus 5 includes event detector 6 which receives and monitors events representing symptoms and determines that a particular event has occurred (for example, a power failure message received from one of the computer nodes). These events, generated by computer nodes 1-3, may be transmitted by any suitable means, such as sending data packets over an Ethernet which are received by apparatus 5.

Apparatus 5 also includes event decoder 10 which receives detected events from event detector 6 and, by way of codebook 11, determines one or more "best fit" problems corresponding to the detected event. Codebook 11 may be stored in a computer storage device such as a disk file or in computer memory, and event decoder 10 comprises means for reading values from codebook 11. After determining the best fit problem, event decoder 10 causes report generator 13 to generate a report 14 which provides an indication of a problem for which corrective action might be taken. Report 14 may be generated in any of various forms such as a message sent to computer systems responsible for automated handling of problems, a record of the problem logged in a storage device (such as a file or a database), a computer-generated printout, a computer display 15, data sent to a software client 16, indicators on a control panel, or the like. Additionally, the reported information may be displayed in alphanumeric or graphical form, or it may comprise a signal containing the reported information which may be further transmitted to another location. Codebook 11 may be generated by codebook generator 12 in accordance with the principles of the invention as outlined in more detail herein. The term "file" as used herein will be understood to include any computer accessible storage including memory, disk, or the like.

Causality matrix 9 contains a mapping of system symptoms to likely problems, preferably with probabilities corresponding to each mapping. The basic causality mapping operation matches observed symptoms against the causing events to identify the root event or problem, which has generated the symptoms. Monitors are located in the system and observe or detect the symptoms that correspond to the mapping representation of causing events and symptoms.

At any moment in time, there will be a sample of observed symptoms. The symptoms may be represented in the form of an array$(s_1, s_2, \ldots, s_n)$, where each $s_i \in \{0,1\}$ corresponds to an entry in the causality mapping (i.e., one of the columns of the matrix representation described herein). The value of $s_i$ is 0 if the symptom has not been observed and 1 if it has been observed. The events, may be represented as, $((c_{1,1}, c_{1,2}, \ldots, c_{1,n}), (c_{2,1}, c_{2,2}, \ldots, c_{2,n}), (c_{m,1}, c_{m,2}, \ldots, c_{m,n}))$. That is, entries in the causality mapping include m events and n symptoms, which are represented as the rows in the matrix representation described herein.

Thus, the likelihood that a reported power failure in one of the computer nodes is the result of a blown fuse may be determined through application of the causality mapping. Although the mapping shown herein is described with regard to a matrix representation, one skilled in the art would recognize that the mapping represents the relationship between causing events and detected events and that the data structure, e.g., matrix, graph, is merely a choice of implementation. Hence, it is not the intention to limit the scope of the invention to the matrix representation shown herein.

Figure 2:
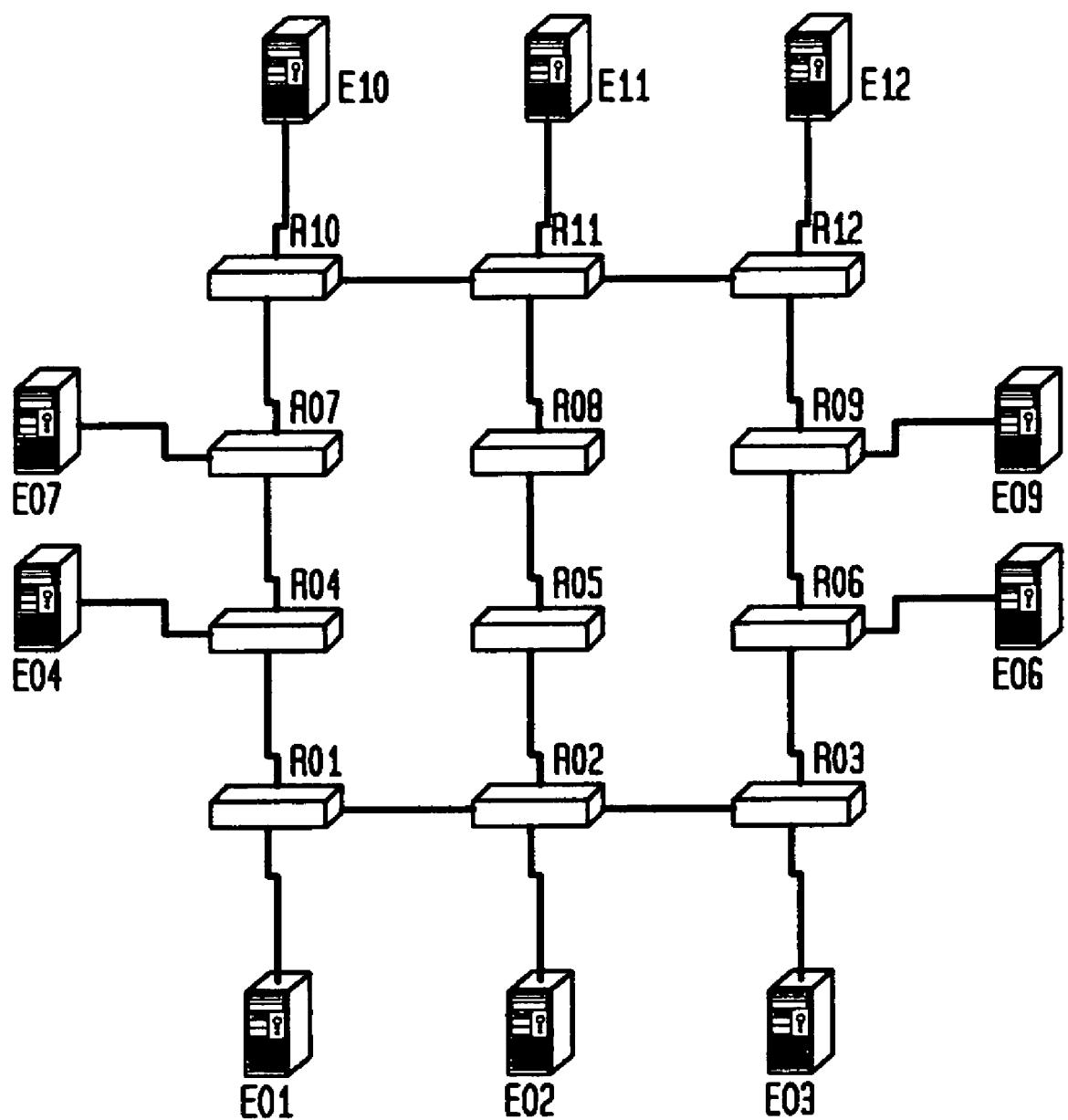
FIG. 2 illustrates a sample network, referred to as "N1;"

FIG. 2 illustrates a sample network N1 200 containing several edge nodes (e.g., servers), which are designated with labels starting with the letter 'E' for Edge, that are used to connect client or consumer (not shown) to the network 200. Further illustrated are routers, which are designated with labels starting with the letter 'R', which are connected to selected edge nodes and proved communication through the network N1 from one edge node to another.

In a particular example, a restriction with regard to the placement of monitors may be that monitors are only placed at the edge nodes and not placed at any of the network internal router nodes. That is, no direct monitoring is performed at the routers. In this case, each monitor will measure a connection between the servers. As there are 10 edge nodes in the network shown in FIG. 2, it can be shown that there are $$\binom{10}{2} = 45$$

possible connections between the edge nodes, i.e., E01 to E02, E01 to E03, E01 to E03, . . . E02 to E03, E02 to E04, . . . E03 to E04, E03 to E05, etc., that must be considered.

As one skilled in the art would recognize, the modeled objects are represented as nodes and the relationships between the modeled objects are represented as edges. Attributes of the modeled objects and links can optionally be assigned. For example, the nodes in the graph of FIG. 3 have different shapes representing their respective positions (edge node or core node) in the system. The shape is a kind of attribute associated with the node object. Other attributes may include the node identifier, number of interfaces at the node, the speed of interfaces, the processing capacity of the nodes and/or interfaces, the memory capacity, etc. However, it would be recognized that the different shapes shown, herein, are merely used to distinguish the different operations of the nodes shown and are not intended to limit the scope of the invention to such shapes.

A routing problem (which is a special kind of event) in a network can occur due to a physical problem, e.g., interface failure, node failure, link failure, etc., or may be a software problem, e.g., routing protocol error, routing control bugs, etc. The symptoms, or detectable events, caused by the physical or software problems may manifest in several forms in different parts of the system, e.g., an overloaded link, delays in application connections, congestion, etc.

Although not shown, it would be recognized that additional problems or failures in routing mechanisms can be reduced to a similar representation as well. For example, link and interface failures can be introduced by including nodes in the graph that explicitly represent the interfaces. A link failure, for example, can be detected by verifying that all interfaces incident to the link are not able to send or receive data. Another possibility is to explicitly include a node that represents the link and include edges in the graph between such a node and all adjacent nodes in the original network. For purpose of illustration, only node failures are used to describe the steps of the method claimed.

The causality mapping content depends on the particular field or system operation to which the method is applied. For purposes of illustration, the methods shown are applied to the problem of node failures and their impact on an application end-to-end connectivity between members or nodes that are a subset (Go) of all the nodes (set G). However, application to other problems is also possible as has been discussed previously.

To understand how a node failure may impact application connections, full information is preferably available about how routing of information (i.e., packets, frames, circuits, etc.) occurs through the network. However, in the absence of such full information, heuristic and other methods may be used that can approximate the missing information.

In one example, when full routing information is available, referred to herein as an FR model, a data structure representing the causality mapping is generated that relates nodes with the application connections that the node failure impacts. That is, each application connection can be considered to know how the contents of the connection are routed. A data structure can then be formulated or generated that relates each node in the path to the application connection.

Figure 3:
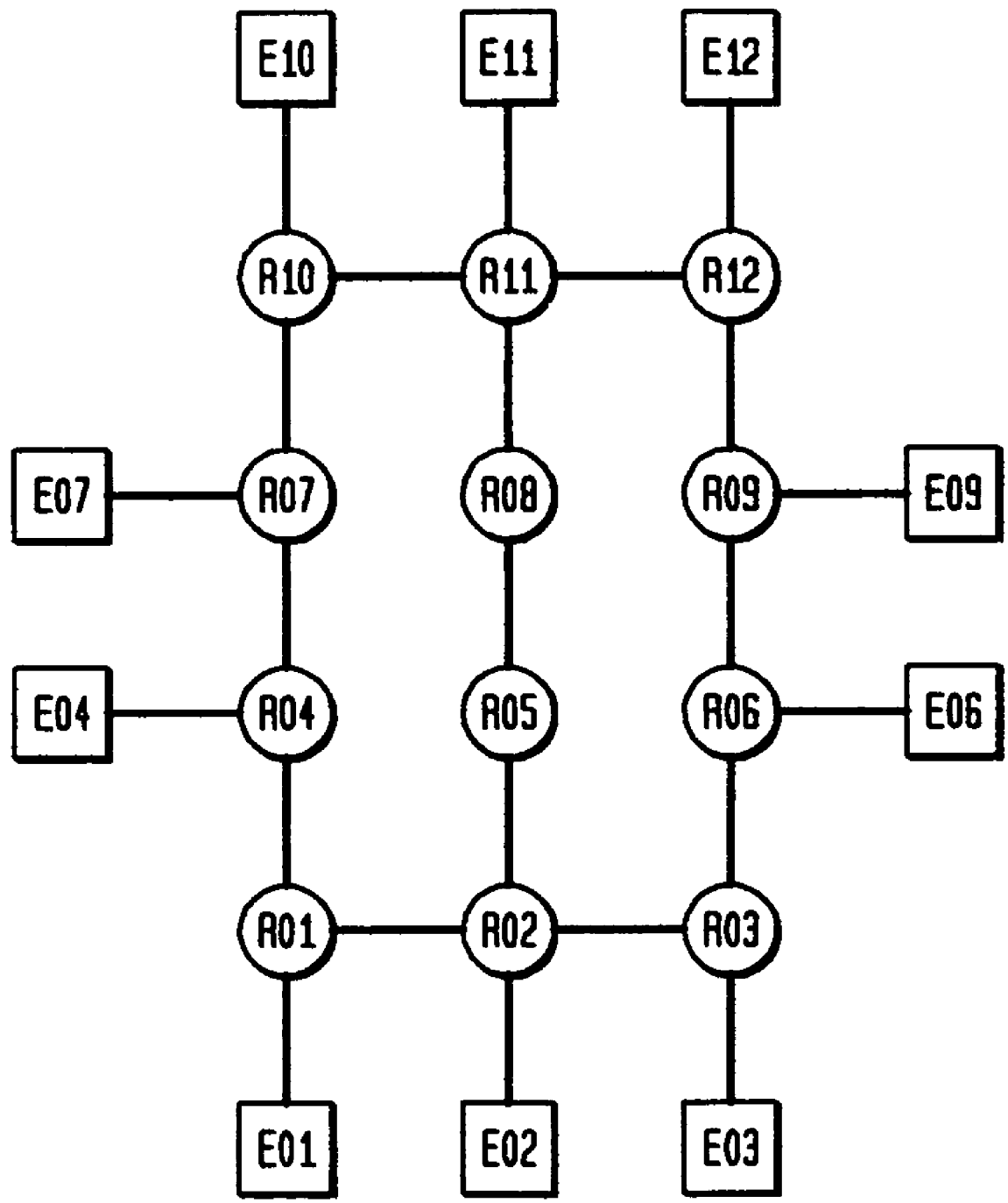
FIG. 3 illustrates a graph representing network the network N1.
Figure 4:
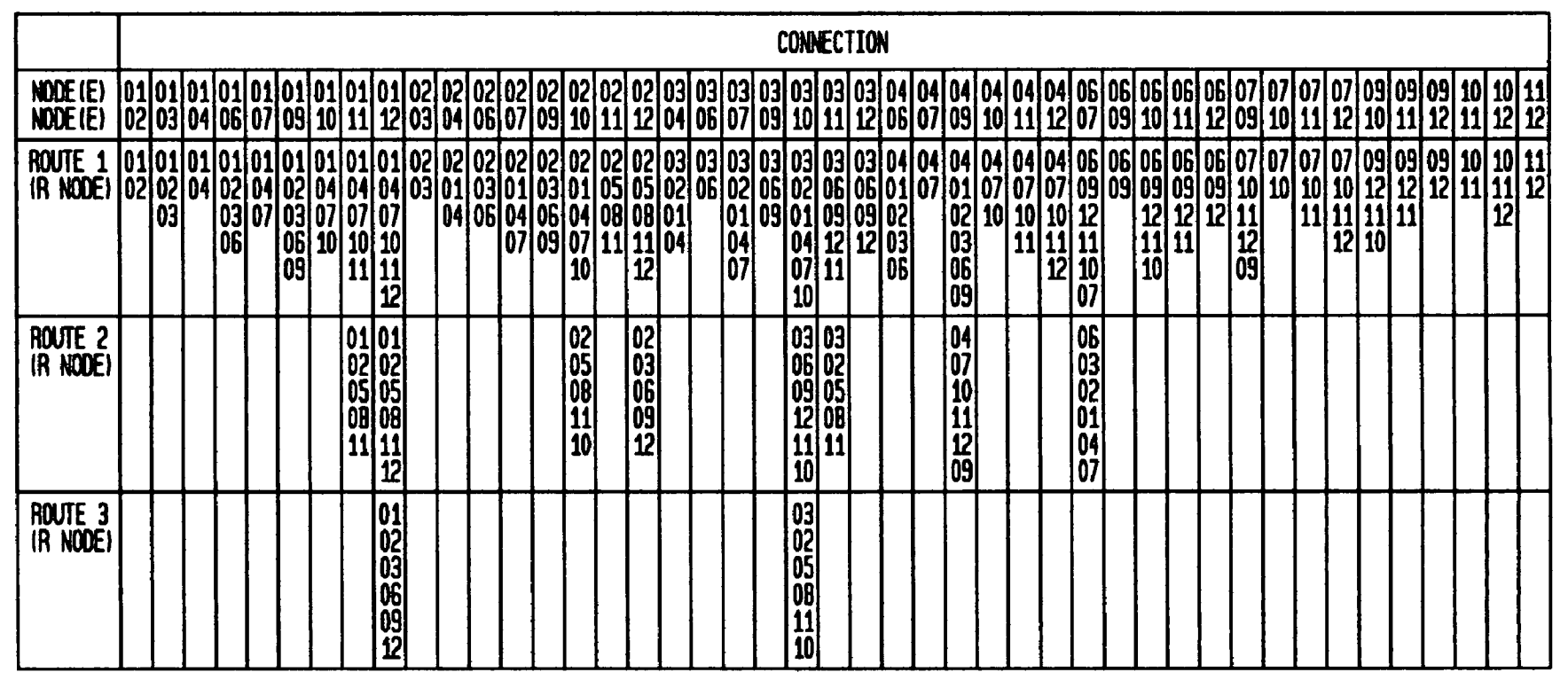

FIG. 4 illustrates the basic FR model routes for application connections in the exemplary network representation shown in FIG. 3, which may be generated manually. In this example, the first two lines identify the pair of edge (E) nodes (connections) and each column lists the routes between the node pair. In this case, the pair of edge nodes represent a subset of nodes of set G that detectable events may be detected or observed. The subsequent rows identify the routes (route 1, route 2, and route 3) between the pair of edge nodes wherein the routes represent a series of router (R) nodes connecting the edge nodes. As would be recognized, only the number part of the route label is represented in the table as the type of node (E or R) can be inferred from the table structure. As an example, there are two routes between nodes E01 and E11: route 1 comprising routers R01, R04, R07, R10, R11 and route 2 comprising routers R01, R02, R05, R08, R11. In this case, a failure of R04, for example, impacts the path (E01, E11) when route 1 is selected but not when route 2 is selected. Hence, the impact of the failure of router R04 on the path between edge nodes E01, E11 depends upon the specific route selected to transfer information items from node E01 to node E11. Hence, there is one probability that a failure in R04 will impact path E01-E11 when route 1 is selected and a second probability that a failure in R04 will impact path E01-E11 when route 2 is selected. On the other hand, once a route is selected a failure of a node in the selected route would impact the path will a 100% probability. Similarly, a failure of router R01 or R11 will impact the path between edge nodes E01 and E11 with 100% probability no matter which route is selected.

For illustrating the principles of the present invention, one route between each node is selected among the available routes to create the codebook model. In this illustrated case, Route 1 is selected for analysis. FIG. 5A illustrates an exemplary process, expressed in pseudo-code, for generating a FR causality mapping (model) representation for the network shown in FIG. 2. In this illustrated process, each node is tested against each connection between nodes and when the tested node is contained within the connection, an indication is made in the column associated with the connection. In this case, the indication represents a fixed value, i.e., 1.

Figure 6:
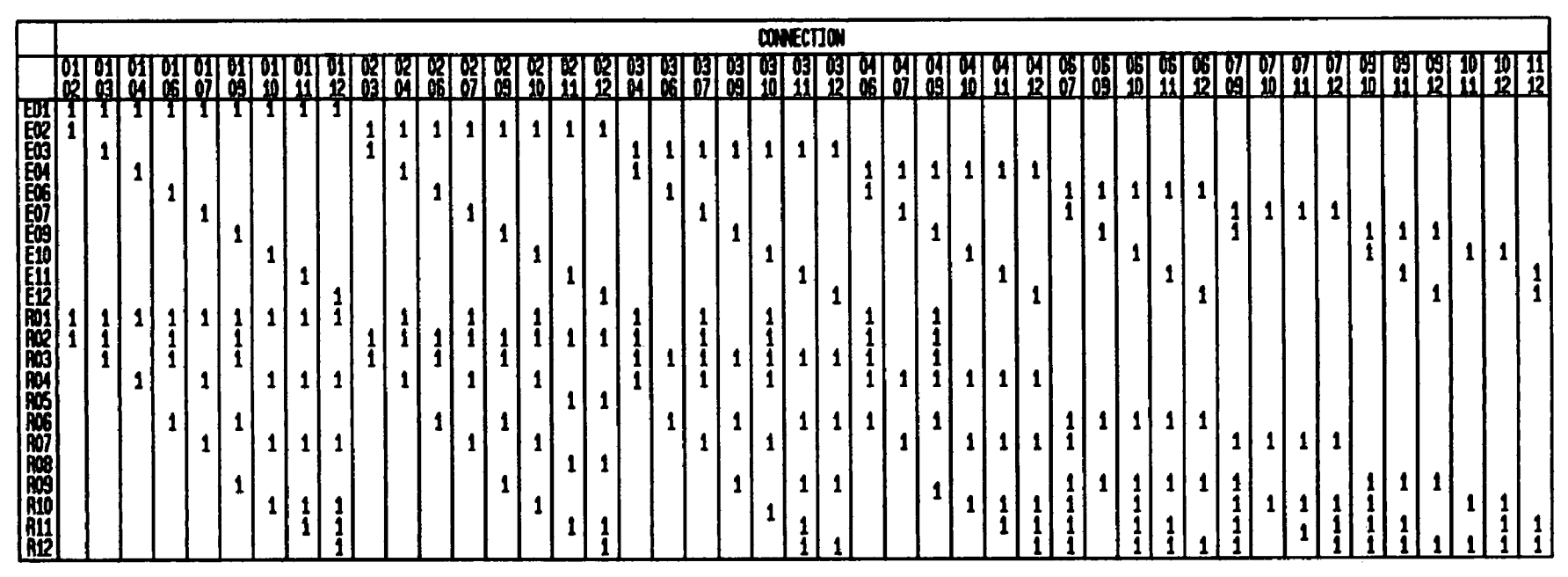

FIG. 6 illustrates the resulting correlation or relationship between edge nodes and router node and the paths between the edge nodes for the network graph shown in FIG. 3 in accordance with the exemplary process shown in FIG. 5A. In this illustrated causality mapping, each row represents a node and each column represents an application connection or paths between two edge nodes (the edge nodes in the first two rows in each column). The intersection of an entry corresponding to a causing event, (a row in this illustrated case) and an entry corresponding to a detected event (a column in this case) is a known value, i.e., "1", when a failure of a selected node in the row impacts the application connection in the respective column. On the other hand, the intersection of a row and a column is empty when a failure of the node in the row does not impact the application connection in the respective column.

An enhancement to the FR algorithm described may include a probability value p that a given node n will be part of a route between nodes (n1, n2). This method is referred to herein as p-FR. FIG. 5B illustrates an exemplary process, expressed in pseudo-code, for generating p-FR model representation. Similar to the processing shown in FIG. 13A, each node is tested against each connection between nodes and when the node is contained within the connection, an indication is made in the entry (column) associated with the connection. In this case, the indication represents a probability value.

As would be recognized, the value contained may be a function of the nodes n1, n2 and node n, and, hence, may be different for each combination of nodes and connectivity. For example, the probability value may be generalized to a function of (n1, n2), p and n, rather than a constant value between nodes n1 and n2. One example of a function $f$ that defines the values in each cell of the codebook may be more formally stated as:

1. a node failure will impact its neighbor with probability p.
2. for a node n, a connection (n1, n2) and a radius r, $f$ can be defined as follows: Let d(x, y) be the distance in hops between x and y.
   1. If d(n, n1)>r and d(n, n2)>r, then $f$(p, n, n1, n2)=0.
   2. If d(n, n1)≦r and d(n, n2)>r, then $f$(p, n, n1, n2)=exp(p, d(n, n1)).
   3. If d(n, n1)>r and d(n, n2)≦r, then $f$(p, n, n1, n2)=exp(p, d(n, n2)).
   4. If d(n, n1)≦r and d(n, n2)≦r, then $f$(p, n, n1, n2)=1−(1−exp(p, d(n, n1))(1−exp(p, d(n, n2))).

An exemplary function exp (x, y) may be represented as $x^y$.

In another aspect of the invention, the function $f$ may be specified to create a higher probability when node n is closer to node n1 or n2 as:

$f$(p, n, n1, n2)=g(p, min{d(n, n1), d(n, n2)}), where g is a known function.

For example, $f$(p, n, n1, n2)=p/min{d(n, n1), d(n, n2)}, which will create a higher probability of impact of a node n the closer n is to n1 or n2.

In still another aspect of the invention, the function $f$ may be specified as:

$f$(p, n, n1, n2)=h(p, d(n, n1)+d(n, n2)), where h( . . . ) is a known function.

For example, $f$(p, n, n1, n2)=p/(d(n, n1)+d(n, n2)) will produce a greater probability of impact of a node n the closer n is to both n1 and n2.

As would be recognized, the probability could be different for each combination of nodes (n1, n2) and node n.

In another aspect of the invention, the impact of node failures in application connections may be limited to the impact of each node failure to nodes within a radius r around failed node n. In this case, the failure may be modeled in the absence of routing information, and is referred to herein as the Limited Number of Hops (LNH) Model.

FIG. 7A illustrates an exemplary process, expressed in pseudo-code, for generating an LNH model representation of the network shown in FIG. 3. In this case, each node is tested against each connection (n1, n2) and when a selected node is within a known number of radius or distance, i.e., nodes hops, from either node n1 or n2, an indication is made in the entry (column) representing the associated connection. In this case, the indication represents a fixed value.

Figure 8A:
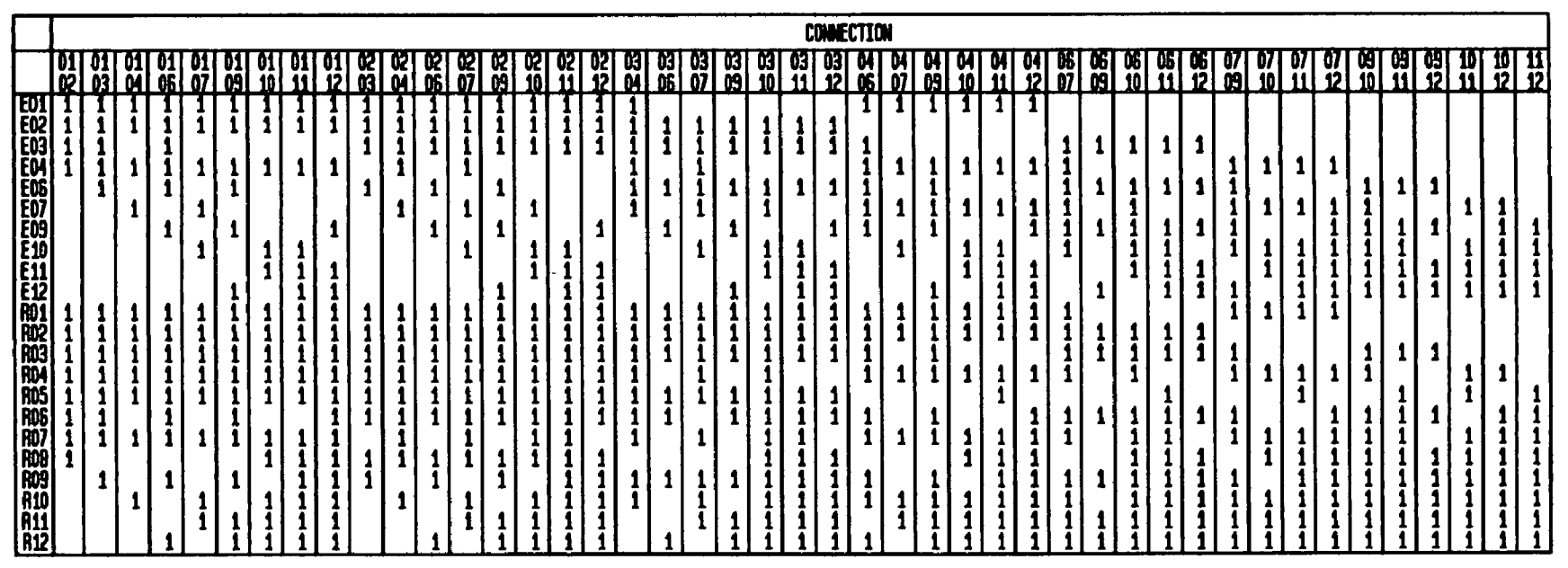

FIG. 8A illustrates the model representation of an LNH model that determines the impact in network 200 (FIG. 3) of failures of a node to up to 3 hops away in accordance with the principles of the invention. In this, failure of router node R08 will have an impact on nodes R05 (1 hop away), R02 (2 hops away), and node (edge-server) E02 (3 hops away). However, a failure in router node R08 will not impact node E06 as it is at a radius (or distance) 5 hops away and beyond the criteria selected. Thus, a failure at router node R08 will impact every connection starting or ending at node E02, but not every connections starting or ending at node E06. Hence, the path or connectivity between nodes E02 and E06 is affected when a failure is detected in router R08, whereas the path between nodes E03 and E06 is not impacted because both E03 and E06 lie further than 3 hops away from the selected node R08.

In accordance with another aspect of the invention, the LNH model may be enhanced to include a probability p that a given node n will impact a connection (n1, n2) and is referred to herein as p-LNH model. FIG. 7B illustrates an exemplary process, expressed in pseudo-code, for generating a p-LNH model representation of the network shown in FIGS. 2 and 3. Similar to the processing shown in FIG. 7A, each node is tested against each connection (n1, n2) and when the node is within a known number of hops from either node n1 or n2, an indication is made in the entry (column) representing the associated connection. In this case, the indication represents a probability value. As would be recognized, the probability value used may be different for each combination of node n1, n2 and node n, and may be similarly represented as described with regard to the p-FR model shown in FIG. 5B.

Furthermore, the probability of the impact may decrease the further away from node n the potentially impacted node is located. As an example, function $f^*$ may be defined for the p-LNH model to fill the cells of the model representation. Such a functions $f^*$ may be represented as:
1. If d(n, n1)>r, then $f^*$(p, n, n1)=0.
2. If d(n, n1)≦r, then $f$(p, n, n1)=exp(p, d(n, n1)).
   where d( . . . ) represents a distance between nodes, and
   r is a radius or number of hops from the impacted node.

If n is larger than the longest path in the network, the model is suitable for predicting an impact of a node on every other node in the network.

Figure 8B:
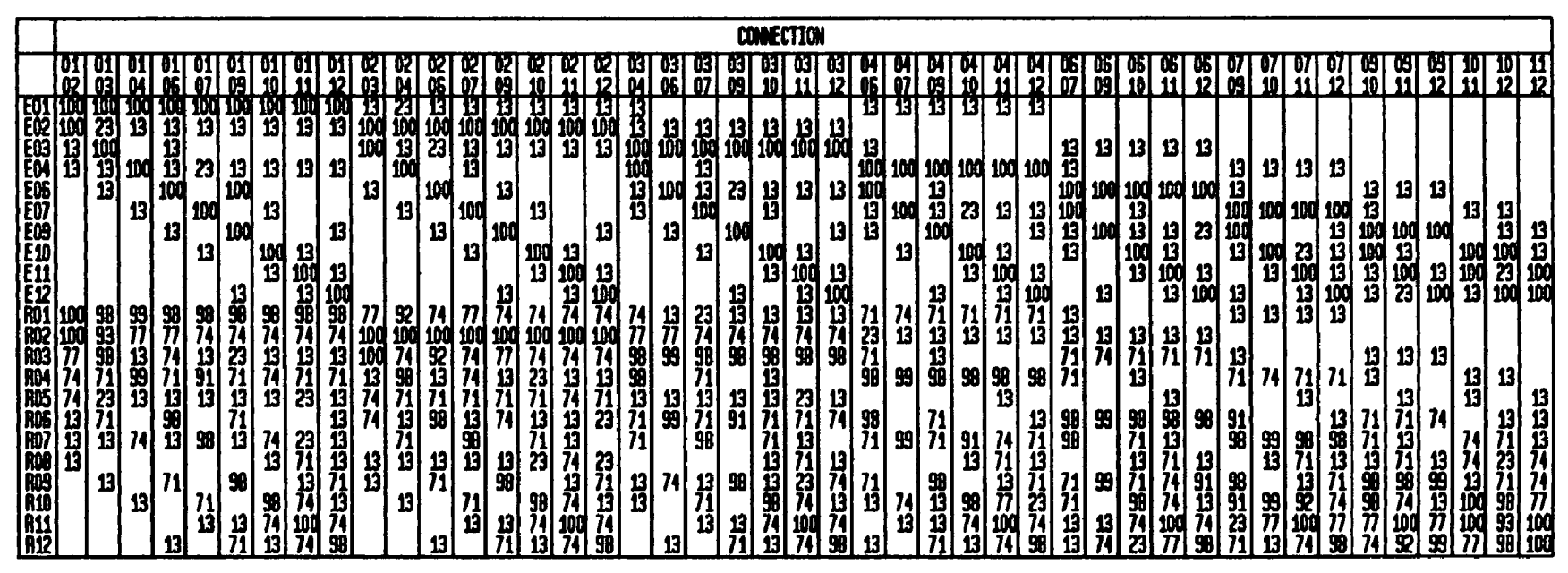

FIG. 8B illustrates an example of a codebook problem-symptom correlation (causality mapping) for network 200 (FIG. 3) wherein probabilities are introduced in the p-LNH model to show the relationship among the nodes. In this case, the dependency are represented as probabilities shown as integer values between 0 and 100.

In another aspect, the LNH model may further relate failures of a node with all the connections starting or ending at an impacted node. In this case, a node LNH representation, referred to as n-LNH, models the edge nodes and not the application connections. In this case, the model reflects the impact of a node n failure on a connection between nodes n1 and n2, wherein the failure impacts at least one of the nodes, i.e., n1 and/or n2, at the edges of the connection. But if node n1 or n2 is impacted, then all connections adjacent to the impacted node (n1 or n2) are also impacted as well. The n-LNH model infers that node n impacts nodes n1 and n2 simply, with no explicit mention to the adjacent connections. In this case, the set of symptoms S is defined to include non-responsiveness of nodes in Go rather than the of application connections, as has been described with regard to FIG. 7A.

Figures 8C, 9:
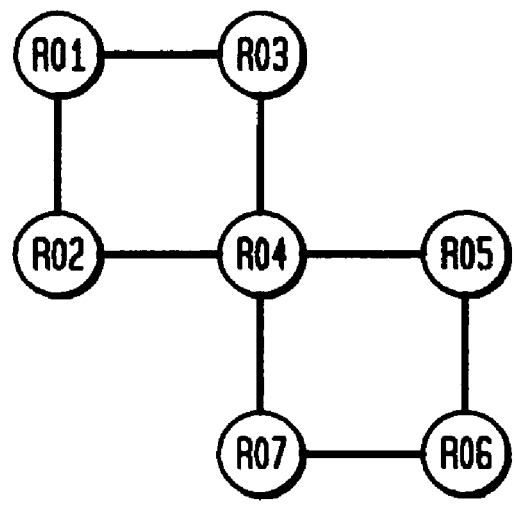
FIG. 8C illustrates a model representation of the network N1, in accordance with a second aspect of the processing shown in FIG. 7A in accordance with the principles of the present invention.
FIG. 9 illustrates a graph representing a second sample network referred to as "N2."

FIG. 8C illustrates an n-LNH model representation for network 200 shown in FIG. 2. In this case, the columns represent edge nodes that are impacted by a failure in a node as represented by the rows. An intersection between a column and a row is set to a known indication or value, i.e., 1, when a failure of the node impacts the edge node in the column.

As with the LNH model, a probabilistic version of the n-LNH model may be formulated to include probabilities of impact in each cell of the codebook.

In accordance with another aspect of the invention, the LNH model may be further enhanced with information about structural constraints in the graph that represents the network. An example of a significant structural constraint may be referred to as a "cut node" in the model representation. A cut node is a node that, when removed, will break or partition the graph into two or more partitions containing connected components. A model that takes into account graph cuts is referred to herein as c-LNH.

With reference to FIG. 9, which is a graphic representation 900 of a second exemplary network, node R04 represents a cut node. The removal or failure in node R04 partitions the graph 900 into two partitions; one containing nodes R1, R2, and R3; and the other containing nodes R5, R6, and R7. A failure of a cut node or a node adjacent to a cut edge impacts all application connections between a node of one partition and a node of another partition, created by the failed node. For example, failure of node R04, in FIG. 9, impacts the connection between node R1 and node R6. Such failures can be explicitly modeled by representing the impact caused by a failure of each cut node on the relevant application connections between the partitions. The identification of cut nodes and cut edges (in graphs) can be performed with well known algorithms such as described in *The Design and Analysis of Computer Algorithms* by Alfred V. Aho, John E. Hopcroft, and Jeffrey D. Ullman, Addison-Wesley Pub Co (1974) ISBN: 0201000296.

FIG. 10 illustrates an example of routing information for the graphic representation shown in FIG. 9, with the impact due to failure in cut node R04 added. That is, an indication, i.e., 1, is included in row associated with node R04, and column (R01, R06) to consider the impact of a failure in node R04.

FIG. 11A illustrates an exemplary process, expressed in pseudo-code, for generating a c-LNH model representation. As shown, this exemplary process is similar to that shown in FIG. 7A with the addition of Step 3 that provides processing with regard to cut nodes. In this exemplary process, for every identified cut node n, a further determination is may whether in the entry representing the connections (n1, n2) and the end nodes n1 and n2 of the connection lie in different partitions of the graph if the node n where eliminated.

In still another aspect, the method shown in FIG. 11A for generating a c-LNH model may be extended with a probabilistic approach similar to the p-LNH process described in FIG. 7B. FIG. 11B illustrates an exemplary process, expressed in pseudo-code, for generating the pc-LNH model representation and is similar to the process shown in FIG. 11A. In this case, the indication set in each entry representing the connectivity represents a probability value. As would be recognized, the value used as an indication may be different fro each combination of node n1, n2 and node n and may be determined in a manner similar to that described with regard to FIGS. 5B and 7B.

Figure 13:
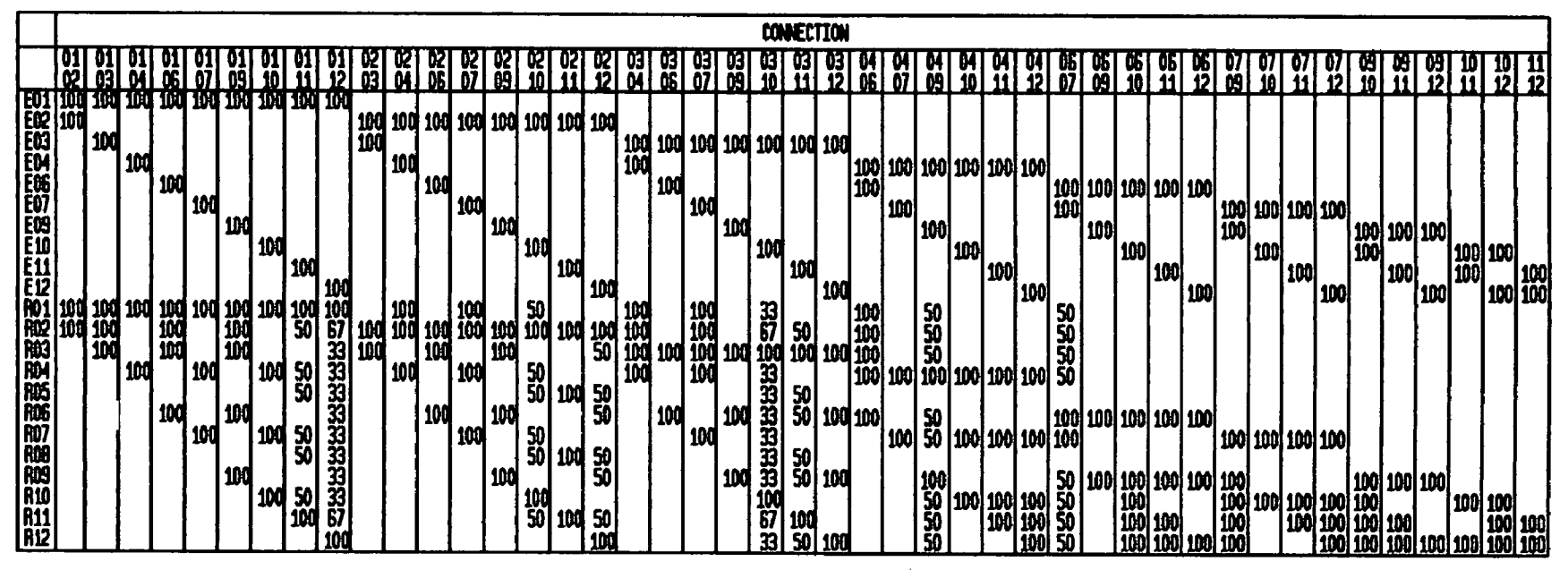

FIGS. 12 and 13 illustrate mapping representations (codebook) of causing events and detected events for the networks shown in FIGS. 9 and 2, respectively, utilizing the processing shown in FIG. 11B.

In accordance with the principles of the invention, an extension to the cut node approach further provides for all the possible routes between any two nodes n1 and n2 in the graph and assigns to each a probability of being the actual route followed by the respective application connection (n1, n2). There are several possible realizations of this general extension, for which an exemplary process is described and referred to herein, as the Structure of the Graph (SG) Model.

In the illustrated embodiment, nodes can be considered to impact application connections with a probability proportional to the number of times they appear in routes that service the given connection. For example, if a node appears in 2 out of 4 routes, then the impact has probability 50%. If the node appears in every route, then the impact probability is 100%.

FIG. 14 illustrates an exemplary process, expressed in pseudo-code, for generating the pc-LNH-SG model for the networks shown in FIGS. 9 and 2, respectively. This exemplary process is advantageous in finding all sets of routes between nodes (n1, n2) with a given property (e.g., the size should be at most k). It then computes the frequency fr that a node n appears in the identified routes between n1 and n2. The probability assigned to the node pair (n1, n2), node n is determined by the function $f$, which is similar to that described with regard to FIGS. 5B and/or 7B.

It would be recognized, the routes R(n1, n2) may be computed using any algorithm or selected by some criterion. For example, the routes selected may be all shortest path routes, or some given number of routes selected by a network manager, etc. Determination of all shortest paths is more fully described with regard to the modified short path algorithm.

The function, g(n1, n2), may, for example, represent the number of all routes in R(n1, n2) of size k, i.e., g(n1, n2, k), and expressed as:

$$g(n1, n2) = \sum_{k=0}^{\infty} g(n1, n2, k)$$

Similarly, the function c(n1, n2) may, for example, represent the number of times that node n appears in all routes in R(n1, n2) of size k, i.e., c(n1, n2, n, k), and expressed as:

$$c(n1, n2, n) = \sum_{k=0}^{\infty} c(n1, n2, n, k)$$

In one exemplary aspect, function h(n1, n2, n) may be expressed as a function of h(n1, n2, n, k) such as:

$$h(n1, n2, n) = \sum_{k=0}^{\infty} h(n1, n2, n, k).$$

In a second example, function may be determined as h(n1, n2, n)=c(n1, n2, n)/g(n1, n2) if g(n1, n2)>0: and h(n1, n2, n)=0 otherwise.

In this second example, function h( . . . ), represents the average number of paths in R(n1, n2) of any size k that contains node n. Hence, h( . . . ) may approximate the probability of n impacting the connection (n1, n2)).

More broadly, instead of the frequency fr, one may compute any other probability function h relating the number of occurrences of n in paths between n1 and n2. In this case, the indication represents a probability value. As would be recognized, the value used as an indication may be different for each combination of node n1, n2 and node n.|

In one aspect of the invention and with reference to step step 2.b.iv shown in FIG. 14, the function h(n1, n2, n) may be expressed as:

h(n1, n2, n)=1 if c(n1, n2, n)>0 and h(n1, n2, n)=0 otherwise.

In this case, the impact of a node n failure is always 100% if it participates in any path of the connection (n1, n2), independent of the number of paths between the edge nodes. This approximate model is advantageous as it work very well and is simpler to implement.

In another aspect of the invention and with reference to step 2.b.i. of FIG. 14, the set of routes R(n1, n2) for all pairs (n1, n2) may include only the ones with shortest paths and function h is the same defined as above. In this case, all the shortest path routes may be found using a modification of the shortest path algorithm described in *The Design and Analysis of Computer Algorithms*. Id.

The modified shortest path algorithm in accordance with the principles of the invention may be expressed, in pseudo code, as:

Let C be a matrix representing the graph G such that:

```
C(i, i) = 0;
C(i, j) = 1 if G contains the edge (i, j), i ≠ j; and
C(i, j) = infinity if G does not contain edge (i, j), i ≠ j.
    The modified shortest path may be determined as:
    cost (G) {
        For every node i in G
            For every node j in G
                Initialize P(i, j) with the empty list {}
        For every node i in G
        For every node j in G
        For every node k in G
            If(C(i, k) + C(k, j) ≤ C(i, j))
                Then inset k in P(i, j)
    }
```

The result is the minimum cost value in matrix C and the list of intermediary nodes providing shortest paths in matrix P.

All shortest paths between two nodes i and j of G may now be determined as:

```
sp (i, j) {
    For every node k in P(i, j)
        For every path p1 in sp (i, k)
            For every path p2 in sp (k, j)
                If path p formed by p1 concatenated with {k}
                concatenated with p2 is not in R(i, j)
                    Insert p in R(i, j)
}
```

The list of all shortest paths will result in R(i, j).

In still another aspect of the invention, the routes R(n1, n2) may include all the shortest path routes plus all the path containing up to x more hops relative to the shortest paths, where x is a known number. That is, if the shortest path between n1 and n2 has size s(n1, n2), then all paths of size up to s(n1, n2)+x may be considered. In this case, the function h(n1, n2, n, k) in step 2.b.iii may be represented as:

h(n1, n2, n, s(n1, n2)+k)=1/(k+1), if n is in a path (n1, n2) of size s(n1, n2)+k, k≤x; and h(n1, n2, n, k)=0, otherwise.

Function h reflects the impact of node n on the (n1, n2) application connection by taking the maximum impact of n on paths of size s(n1, n2), s(n1, n2)+1, . . . , x may then be determined as:

h(n1, n2, n)=max$_k$h(n1, n2, n, k).

Figure 15:
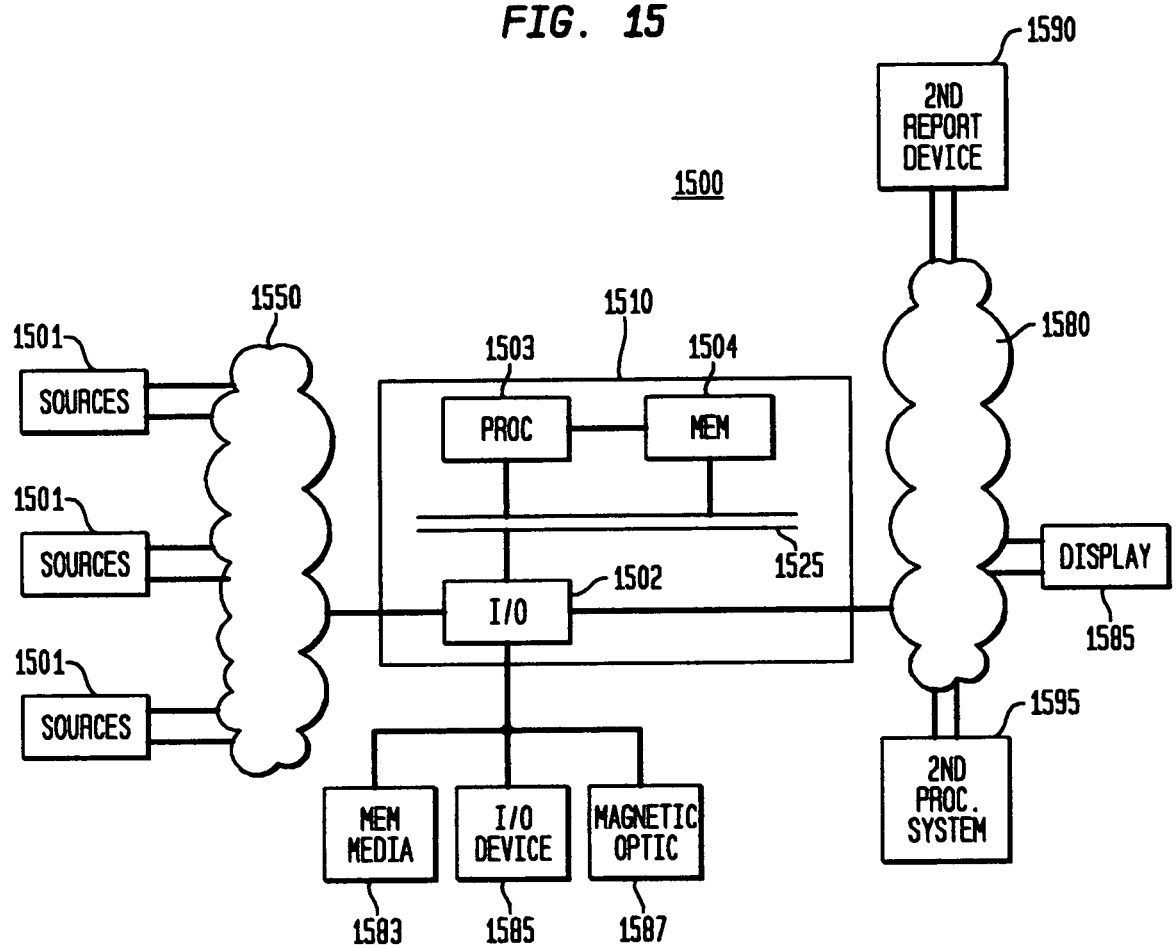
FIG. 15 illustrates a system for implementing the processing shown herein.

FIG. 15 illustrates an exemplary embodiment of a system or apparatus 1500 that may be used for implementing the principles of the present invention. System 1500 includes processing unit 1510 that may contain one or more input/output devices 1502, processors 1503 and memories 1504. I/O devices 1502 may access or receive information from one or more sources or devices 1501. Sources or devices 1501 may be devices such as routers, servers, computers, notebook computer, PDAs, cells phones or other devices suitable for transmitting and receiving information responsive to the processes shown herein. Devices 1501 may have access over one or more network connections 1550 via, for example, a wireless wide area network, a wireless metropolitan area network, a wireless local area network, a terrestrial broadcast system (Radio, TV), a satellite network, a cell phone or a wireless telephone network, or similar wired public networks, such as POTS, INTERNET, LAN, WAN and/or private networks, e.g., INTRANET, as well as portions or combinations of these and other types of networks. Network 1550 may similarly represent a communication bus, such as PCI, USB, Firewire, etc.

Input/output devices 1502, processors 1503 and memories 1504 may communicate over a communication medium 1525. Communication medium 1525 may represent, for example, a bus, a communication network, one or more internal connections of a circuit, circuit card or other apparatus, as well as portions and combinations of these and other communication media. Input data from the devices 1501 is processed in accordance with one or more programs that may be stored in memories 1504 and executed by processors 1503. Memory 1504 may be selected preferably from semiconductor memories such as a Read-Only Memory (ROM), a Programmable ROM, a Random Access Memory, which is accessible through medium 1525 or may be a cache memory in direct communication with processors 1503. Processors 1503 may be any means, such as general purpose or special purpose computing system, such as a laptop computer, desktop computer, a server, handheld computer, or may be a hardware configuration, such as dedicated logic circuit, or integrated circuit. Processors 1503 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In a one aspect, the processes shown herein may be represented by computer readable code stored on a computer readable medium. The code may also be stored in the memory 1504. The code may be read or downloaded from a memory medium 1583, an I/O device 1585 or media, such as a floppy disk, a CD-ROM or a DVD, 1587, or over one or more networks, e.g., 1550, 1580, etc. The downloaded computer readable code may be stored in memory 1504 or executed directly by processor 1503. Further it would be understood that the code may be processor specific or processor non-specific. Code written in the Java programming language is an example of processor non-specific code. Java is a trademark of the Sun Microsystems Corporation.

Information from device 1501 received by I/O device 1502, after processing in accordance with one or more software programs operable to perform the functions illustrated herein, may also be transmitted over network 1580 to one or more output devices represented as display 1592, reporting device 1590, e.g., printer, or second processing system 1595. As would be recognized, network 1580 may be physically the same as network 1550 or may be a different network that operates on the same or different communication principles as that of network 1550. Similarly, networks 1550, 1580 and bus 1525 may be the same or different entities.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, although the present invention has been describe with regard to a connectivity between two nodes, n1 and n2, it would be recognized that the present invention is applicable to a multi-cast distributed system wherein connectivity may be made between nodes n1 and n2, n3, etc. Hence, the detectable events are associated with a subset of nodes. It is expressly intended that all combinations of those elements that perform substantially the same function in substantially the same way to achieve the same results are within the scope of the invention. Substitutions of elements from one described embodiment to another are also fully intended and contemplated. Furthermore, while the distributed systems described herein with regard to computer network systems and software applications, it would be recognized that the method and system described may be applied, but are not limited, to distributed systems such as telecommunication networks, distributed application systems (e.g., transaction systems, web services, databases, application systems), active network based systems, sensor systems, satellite systems, biological systems, financial systems, software applications and other systems built of components connected by relationships where events propagate through the components or relationships.

What is claimed is:

1. A computer implemented method for determining causality mapping between causing events and detectable events among a plurality of nodes in a distributed system comprising physical devices, the method comprising the steps of:

automatically generating, in one or more computers, a causality mapping model, the mapping model mapping the dependences between causing events at the nodes and detectable events associated with a subset of the nodes, the model suitable for representing the execution of at least one system operation; wherein each causing event of the causing events corresponds to a cause of a problem in the distributed system; wherein each detectible event of the detectible events corresponds to a symptom of at least one problem in the distributed system; and wherein the mapping model may be used in determining at least one causing event contributing to the cause of the detected event;

wherein the step of generating the model comprises the steps of:

selecting nodes associated with each of the detectable events from the subset of the nodes;

indicating the dependency between a causing event and at least one detectable event for each causing event at a node when the causing event node divides the system into a plurality of disjoint partitions and at least one of the nodes associated with a selected detectable event is contained in one of the disjoint partitions and at least one other of the nodes associated with the selected detectable event is contained in another one of the disjoint partitions.

2. The method as recited in claim 1, wherein the step of generating the model comprises the steps of: selecting nodes associated with each of the detectable events from the subset of the nodes; and indicating the dependency between causing events and each of the detectable events for each causing event at a node when the causing event node is in one of the routes between the selected nodes.

3. The method as recited in claim 1, wherein the step of generating the model comprises the step of:

indicating the dependency between a causing event and at least one detectable event for each causing event at a node when the causing event node is a known distance from at least one node selected from the selected nodes.

4. The method as recited in claim 1, wherein the step of generating the model comprises the steps of: selecting nodes associated with each of the detectable events from the subset of the nodes; and indicating the dependency between a causing event and at least one detectable event for each causing event at a node when the causing event node divides the system into a plurality of disjoint partitions and at least one of the nodes associated with a selected detectable event is contained in one of the disjoint partitions and at least one other of the nodes associated with the selected detectable event is contained in another one of the disjoint partitions.

5. The method as recited in claim 1, wherein the step of generating the model comprises the steps of: selecting nodes associated with each of the detectable events from the subset of the nodes; and indicating the dependency between a causing event and at least one detectable event for each causing event when the causing event node is a known distance from at least one node associated with the detectable event, wherein the dependency is a function of the number of times the causing event node appears in the routes between the nodes.

6. The method as recited in claim 1, wherein the system operation is selected from the group consisting of: fault detection, fault monitoring, performance, congestion, connectivity, interface failure, node failure, link failure, routing protocol error, routing control errors, and root-cause analysis.

7. The method as recited in claim 1, wherein the dependency represents a probability a detected event was caused by a causing event.

8. The method as recited in claim 7, wherein the probability decreases as a function of the number nodes from the causing event node.

9. The method as recited in claim 1, wherein the dependency is a predetermined value.

10. The method as recited in claim 1, wherein model is selected from the group consisting of: a causality matrix and causality graph.

11. The method as recited in claim 1, wherein the path between nodes selected from the subset of nodes represents the shortest paths.

12. The method as recited in claim 1, wherein the dependency is a measure of the number of times a causing event node appears in the total number of paths between the nodes selected from the subset of nodes.

13. An apparatus for determining causality mapping between causing events and detectable events among a plurality of nodes in a distributed system, the apparatus comprising: a processor in communication with a memory, the processor executing code for: automatically generating a causality mapping model, the mapping model mapping the dependences between causing events at the nodes and detectable events associated with a subset of the nodes, the model suitable for representing the execution of at least one system operation; wherein each causing event of the causing events corresponds to a cause of a problem in the distributed system; wherein each detectible event of the detectible events corresponds to a symptom of at least one problem in the distributed system; and wherein the mapping model may be used in determining at least one causing event contributing to the cause of the detected event; wherein the processor further executing code for generating the model comprising:

selecting nodes associated with each of the detectable events from the subset of the nodes;

indicating the dependency between a causing event and at least one detectable event for each causing event at a node when the causing event node divides the system into a plurality of disjoint partitions and at least one of the nodes associated with a selected detectable event is contained in one of the disjoint partitions and at least one other of the nodes associated with the selected detectable event is contained in another one of the disjoint partitions.

14. The apparatus as recited in claim 13, the processor further executing code for generating the model comprising: selecting nodes associated with each of the detectable events from the subset of the nodes; and indicating the dependency between causing events and each of the detectable events for each causing event at a node when the causing event node is in one of the routes between the selected nodes.

15. The apparatus as recited in claim 13, the processor further executing code for generating the model comprising: indicating the dependency between a causing event and at least one detectable event for each causing event at a node when the causing event node is a known distance from at least one node selected from the selected nodes.

16. The apparatus as recited in claim 13, wherein the processor further executing code for generating the model comprising: selecting nodes associated with each of the detectable events from the subset of the nodes; and indicating the dependency between a causing event and at least one detectable event for each causing event at a node when the causing event node divides the system into a plurality of disjoint partitions and at least one of the nodes associated with a selected detectable event is contained in one of the disjoint partitions and at least one other of the nodes associated with the selected detectable event is contained in another one of the disjoint partitions.

17. The apparatus as recited in claim 13, the processor further executing code for generating the model comprising: selecting nodes associated with each of the detectable events from the subset of the nodes; and indicating the dependency between a causing event and at least one detectable event for each causing event when the causing event node is a known distance from at least one node associated with the detectable event, wherein the dependency is a function of the number of times the causing event node appears in the routes between the nodes.

18. The apparatus as recited in claim 13, wherein the system operation is selected from the group consisting of: fault detection, fault monitoring, interface failure, node failure, link failure, routing protocol error, routing control errors, and root-cause analysis.

19. The apparatus as recited in claim 13, wherein the dependency represents a probability a detected event was caused by a causing event.

20. The apparatus as recited in claim 13, wherein the indication is a predetermined value.

21. The apparatus as recited in claim 13, wherein model is selected from the group consisting of: a causality matrix and causality graph.

22. The apparatus as recited in claim 13, wherein the path between nodes selected from the subset of nodes represents the shortest paths.

23. The apparatus as recited in claim 13, wherein the dependency is a measure of the number of times a causing event node appears in the total number of paths between the nodes selected from the subset of nodes.

24. A non-transitory computer-readable medium containing code for determining causality mapping between causing events and detectable events among a plurality of nodes in a distributed system, the code providing instruction to a processing system for executing code for: automatically generating a causality mapping model, the mapping model mapping the dependences between causing events at the nodes and detectable events associated with a subset of the nodes, the model suitable for representing the execution of at least one system operation; wherein each causing event of the causing events corresponds to a cause of a problem in the distributed system; wherein each detectible event of the detectible events corresponds to a symptom of at least one problem in the distributed system; and wherein the mapping model may be used in determining at least one causing event contributing to the cause of the detected event.

25. The non-transitory computer-readable medium as recited in claim 24, the code providing instruction to the processing system for generating the model comprising: selecting nodes associated with each of the detectable events from the subset of the nodes; and indicating the dependency between causing events and each of the detectable events for each causing event at a node when the causing event node is in one of the routes between the selected nodes.

26. The non-transitory computer-readable medium as recited in claim 24 the code providing instruction to the processing system for generating the model comprising: indicating the dependency between a causing event and at least one detectable event for each causing event at a node when the causing event node is a known distance from at least one node selected from the selected nodes.

27. The non-transitory computer-readable medium as recited in claim 24, the code providing instruction to the processing system for generating the model comprising: selecting nodes associated with each of the detectable events from the subset of the nodes; and indicating the dependency between a causing event and at least one detectable event for each causing event at a node when the causing event node divides the system into a plurality of disjoint partitions and at least one of the nodes associated with a selected detectable event is contained in one of the disjoint partitions and at least one other of the nodes associated with the selected detectable event is contained in another one of the disjoint partitions.

28. The non-transitory computer-readable medium as recited in claim 24, the code providing instruction to the processing system for generating the model comprising: selecting nodes associated with each of the detectable events from the subset of the nodes; and indicating the dependency between a causing event and at least one detectable event when the causing event node is a known distance from at least one node associated with the detectable event, wherein the dependency is a function of the number of times the causing event node appears in the routes between the nodes.

29. The non-transitory computer-readable medium as recited in claim 24, wherein the system operation is selected from the group consisting of: fault detection, fault monitoring, failure, node failure, link failure, routing protocol error, routing control errors, and root-cause analysis.

30. The non-transitory computer-readable medium as recited in claim 24, wherein the dependency represents a probability a detected event was caused by a causing event.

31. The non-transitory computer-readable medium as recited in claim 24, wherein the probability decreases as a function of the number nodes from the causing event node.

32. The non-transitory computer-readable medium as recited in claim 24, wherein the dependency is a predetermined value.

33. The non-transitory computer-readable medium as recited in claim 24, wherein model is selected from the group consisting of: a causality matrix and causality graph.

34. The non-transitory computer-readable medium as recited in claim 24, wherein the path between nodes selected from the subset of nodes represents the shortest paths.

35. The non-transitory computer-readable medium as recited in claim 24, wherein the dependency is a measure of the number of times a causing event node appears in the total number of paths between the nodes selected from the subset of nodes.

* * * * *